US012760199B2

(12) United States Patent
Horton et al.

(10) Patent No.: US 12,760,199 B2
(45) Date of Patent: Oct. 13, 2026

(54) DAYLIGHT CURING CONCRETE PRIMER COMPOSITION

(71) Applicant: GCP Applied Technologies Inc., Malvern, PA (US)

(72) Inventors: Steven Horton, Manchester (GB); Rachel Weston, West Yorkshire (GB)

(73) Assignee: GCP Applied Technologies Inc., Malvern, PA (US)

( * ) Notice: Subject to any disclaimer, the term of this patent is extended or adjusted under 35 U.S.C. 154(b) by 0 days.

(21) Appl. No.: 18/619,548

(22) Filed: Mar. 28, 2024

(65) Prior Publication Data

US 2024/0327669 A1 Oct. 3, 2024

Related U.S. Application Data

(60) Provisional application No. 63/493,560, filed on Mar. 31, 2023.

(51) Int. Cl.

| | |
|---|---|
| ***C09D 133/14*** | (2006.01) |
| ***C04B 41/00*** | (2006.01) |
| ***C04B 41/48*** | (2006.01) |
| ***C04B 41/63*** | (2006.01) |
| ***C09D 4/00*** | (2006.01) |

(Continued)

(52) U.S. Cl.

CPC ........ *C09D 133/14* (2013.01); *C04B 41/0045* (2013.01); *C04B 41/009* (2013.01); *C04B 41/483* (2013.01); *C04B 41/63* (2013.01); *C09D 4/00* (2013.01); *C09D 5/002* (2013.01); *C09D 7/65* (2018.01)

(58) Field of Classification Search

None

See application file for complete search history.

(56) References Cited

U.S. PATENT DOCUMENTS

| | | | | |
|---|---|---|---|---|
| 4,528,307 A * | 7/1985 | Fuhr | ..................... C04B 41/483 | 522/90 |
| 6,617,413 B1 * | 9/2003 | Bruchmann | ....... C08G 18/7837 | 427/508 |

(Continued)

FOREIGN PATENT DOCUMENTS

| | | |
|---|---|---|
| AU | 2021102994 A4 | 7/2021 |
| JP | 2006274723 A | 10/2006 |

(Continued)

OTHER PUBLICATIONS

TPO Photoinitiator (CAS No. 75980-60-8): Understanding the Wavelength—blog post from Zhuoer Chemical. [online]. [retrieved on Jun. 14, 2025]. Retrieved from Internet <URL:https://www.zhuoerchem.com/news/tpo-photoinitiator-cas-no-75980-60-8-understanding-the-wavelength/> (Year: 2025).*

(Continued)

*Primary Examiner* — Sanza L. McClendon
(74) *Attorney, Agent, or Firm* — Abel Schillinger, LLP; Robert N. Young

(57) ABSTRACT

According to one aspect, a primer composition can include a first component including a first monomer, a second component, and a photoinitiator. The first component can be polymerized in the presence of free radicals. The second component can include a radiation curable oligomer or a bead polymer. The composition can cure in natural daylight.

33 Claims, 1 Drawing Sheet

(51) Int. Cl.
*C09D 5/00* (2006.01)
*C09D 7/65* (2018.01)

(56) References Cited

U.S. PATENT DOCUMENTS

| | | | | |
|---|---|---|---|---|
| 6,693,141 | B2 * | 2/2004 | Baudin | C07F 7/21 522/42 |
| 6,777,458 | B1 * | 8/2004 | Jaworek | B05D 3/0486 264/494 |
| 7,291,654 | B2 * | 11/2007 | Ulrich | C07D 295/112 522/39 |
| 8,507,726 | B2 * | 8/2013 | Studer | C08F 2/50 522/74 |
| 8,906,979 | B2 * | 12/2014 | Frey | C07C 219/06 560/194 |
| 9,701,762 | B2 * | 7/2017 | Nesvadba | C07C 69/616 |
| 9,757,493 | B2 | 9/2017 | Lin et al. | |
| 9,796,740 | B2 * | 10/2017 | Cunningham | C07F 9/5337 |
| 10,040,810 | B2 * | 8/2018 | Müller | C09D 135/02 |
| 2005/0197417 | A1 | 9/2005 | Sitzmann et al. | |
| 2012/0148833 | A1 * | 6/2012 | Cao | C04B 41/009 522/18 |
| 2013/0101837 | A1 * | 4/2013 | Cao | B05D 5/06 522/42 |
| 2013/0101861 | A1 * | 4/2013 | Cao | E04F 15/12 522/78 |
| 2013/0303649 | A1 * | 11/2013 | Ichiryu | C08F 293/005 524/99 |
| 2015/0191622 | A1 * | 7/2015 | Zhao | C09D 151/003 522/18 |
| 2019/0389236 | A1 | 12/2019 | Tiessen et al. | |
| 2021/0095133 | A1 | 4/2021 | Sitzmann et al. | |

FOREIGN PATENT DOCUMENTS

| | | | | |
|---|---|---|---|---|
| WO | WO-2006030029 | A1 * | 3/2006 | C09D 175/04 |
| WO | 2006082145 | A1 | 8/2006 | |
| WO | 2011003249 | A1 | 1/2011 | |
| WO | 2011084554 | A1 | 7/2011 | |
| WO | WO-2012006200 | A1 * | 1/2012 | C04B 41/483 |
| WO | WO-2018102341 | A1 * | 6/2018 | G03F 7/031 |
| WO | 2020142571 | A1 | 7/2020 | |

OTHER PUBLICATIONS

International Search Report and Written Opinion for PCT Application No. PCT/US2024/021837, dated Jul. 18, 2024, 9 pages.

* cited by examiner

DAYLIGHT CURING CONCRETE PRIMER COMPOSITION

CROSS-REFERENCE TO RELATED APPLICATION(S)

This Application claims priority under 35 U.S.C. § 119 (e) to U.S. Provisional Patent Application No. 63/493,560, entitled "DAYLIGHT CURING CONCRETE PRIMER COMPOSITION," by Steven HORTON et al., filed Mar. 31, 2023, which is assigned to the current assignee hereof and is incorporated herein by reference in its entirety.

BACKGROUND

Field of the Disclosure

The following is directed to primer compositions, and more specifically concrete primer compositions that cure in daylight.

SUMMARY

According to one aspect, a primer composition can include a first component including a first monomer, a second component, and a photoinitiator. The first component can be polymerized in the presence of free radicals. The second component can include a radiation curable oligomer or a bead polymer. The composition can cure in natural daylight.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to primer compositions. The primer compositions can cure in natural daylight. Natural daylight may be defined as natural outdoor light between sunrise and sundown. Daylight does not necessarily mean direct sunlight as daylight is still present during overcast weather. Daylight includes electromagnetic radiation having wavelengths between 315 nm and 400 nm. The primer compositions do not require on-site addition or mixing of an initiator or catalyst. Nor is there a requirement for any (high energy) artificial light.

Figure 1:
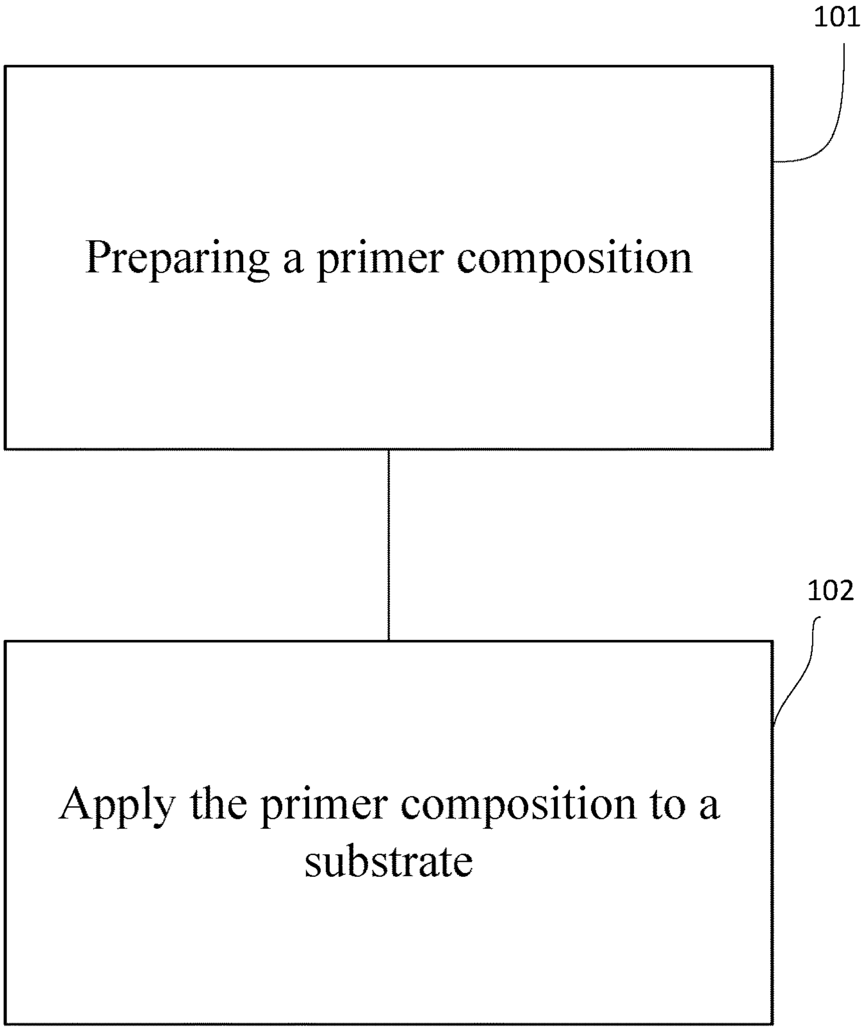
FIG. 1 includes a process for forming and applying a concrete primer composition.

FIG. 1 includes a process for forming and applying a primer composition. Step 101 may include mixing a primer composition. Step 102 may include applying the primer composition to a substrate.

Figure 2:
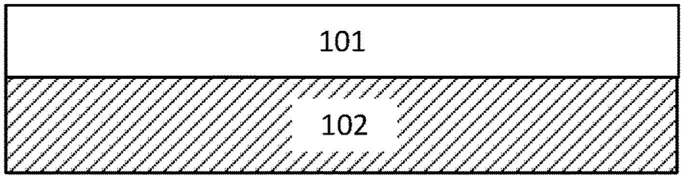
FIG. 2 includes an illustration of a primer overlying a substrate.

FIG. 2 includes an illustration of a primer composition 201 on substrate 202.

In an embodiment, the primer composition 201 can include a first component including a first monomer. The first monomer may have a particular composition that may facilitate improved manufacturing and/or performance of the composition. In an embodiment, the first monomer may include a methacrylate monomer. In an embodiment, the methacrylate monomer may include a hydroxyl group. In an embodiment, the methacrylate monomer can be a di-functional monomer or a tri-functional monomer. In an embodiment, the methacrylate monomer can be a crosslinking (meth)acrylate monomer. In an embodiment, the monomer can include Methyl methacrylate (MMA), Hydroxypropyl methacrylate (HPMA), Hydroxyethyl methacrylate (HEMA), or any combination thereof. In an embodiment, the first monomer can have the structure $H_2C{=}C(R^1)COOR^2$, wherein $R^1$ represents hydrogen atom or methyl group; $R^2$ represents linear or branched alkyl, hydroxyalkyl, aryl, acyclic, polycyclic, heterocyclic, or heteroaromatic group from $C_2$ to $C_{18}$. In a more particular embodiment, $R^1$ can be a methyl group. In another particular embodiment, $R^2$ can be a hydroxyalkyl group. In an even more particular embodiment, $R^2$ can be a hydroxypropyl group.

In an embodiment, the first monomer may have a particular flash point that may facilitate improved manufacturing and/or performance of the composition. In an embodiment, the first monomer can have a flash point of at least 50° C. or at least 51° C. or at least 52° C. or at least 53° C. or at least 54° C. or at least 55° C. or at least 56° C. or at least 57° C. or at least 58° C. or at least 59° C. or at least 60° C.

In an embodiment the first monomer includes particular wt. % of the total composition that may facilitate improved manufacturing and/or performance of the composition. In an embodiment, the first monomer can include at least 60 wt. % of the total weight of the composition or at least 62 wt. % or at least 64 wt. % or at least 66 wt. % or at least 68 wt. % or at least 70 wt. % or at least 72 wt. % or at least 74 wt. % or at least 76 wt. % or at least 78 wt. % or at least 80 wt. %. In an embodiment, the first monomer can include no greater than 99 wt. % of the total weight of the composition or no greater than 98 wt. % or no greater than 97 wt. % or no greater than 96 wt. % or no greater than 95 wt. % or no greater than 94 wt. % or no greater than 93 wt. % or no greater than 92 wt. % or no greater than 91 wt. % or no greater than 90 wt. %. It will be appreciated that the wt. % of the first monomer may be between any of the minimum and maximum values noted above, including for example, but not limited to at least 66% and not greater than 95% or at least 80% and not greater than 90%. It will be appreciated that the first monomer wt. % may be within a range between any of the minimum and maximum values noted above. It will be further appreciated that the first monomer wt. % may be any value between any of the minimum and maximum values noted above.

In an embodiment the primer composition can include a second component including a radiation curable oligomer, a bead polymer, or any combination thereof.

In an embodiment, the second component can include a particular radiation curable oligomer that may facilitate improved manufacturing and/or performance of the primer composition. In an embodiment, the radiation curable oligomer may include an acrylate, a methacrylate, a urethane (meth) acrylate, an epoxy (meth) acrylate, a polyester (meth) acrylate, an acrylic, a hydrocarbon (meth) acrylate, or any combination thereof. In a more particular embodiment, the radiation curable oligomer may include a urethane methacrylate. In an embodiment, the radiation curable oligomer may include the structure, $(H_2C{=}C(R^1)COOR^2)_2{-}R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof.

In an embodiment, the radiation curable oligomer may have a particular $N_A$ MW that may facilitate improved performance and/or manufacturing of the primer composition. In an embodiment, the radiation curable oligomer may have an $N_A$ MW of at least 200 g/mol or daltons or at least 500 g/mol or at least 1000 g/mol or at least 2000 g/mol or at least 3000 g/mol or at least 4000 g/mol or at least 5000 g/mol or at least 6000 g/mol or at least 7000 g/mol or at least 8000 g/mol or at least 9000 g/mol or at least 10,000 g/mol. In an embodiment, the radiation curable oligomer may have an $N_A$ MW of less than 20,000 g/mol or less than 19,000 g/mol or less than 18,000 g/mol or less than 17,000 g/mol or less than 16,000 g/mol or less than 15,000 g/mol or less than 14,000 g/mol or less than 13,000 g/mol or less than 12,000 g/mol. It will be appreciated that the $N_A$ MW of the radiation curable oligomer may be between any of the minimum and maximum values noted above, including for example, but not limited to, at least 2,000 g/mol and not greater than 20,000 g/mol or at least 6000 g/mol and not greater than 19,000 g/mol. It will be appreciated that $N_A$ MW of the radiation curable oligomer may be within a range between any of the minimum and maximum values noted above. It will be further appreciated that $N_A$ MW of the radiation curable oligomer may be any value between any of the minimum and maximum values noted above.

In an embodiment, the radiation curable oligomer may include a particular wt. % of the total weight of the composition that may facilitate improved performance and/or manufacturing of the primer composition. In an embodiment the radiation curable oligomer can have at least 1 wt. % of the total weight of the composition or at least 2 wt. % or at least 3 wt. % or at least 4 wt. % or at least 5 wt. % of the total weight of the composition. In an embodiment, the radiation curable oligomer can have no greater than 50 wt. % of the total weight of the composition or no greater than 48 wt. % or no greater than 46 wt. % or no greater than 44 wt. % or no greater than 42 wt. % or no greater than 40 wt. % or no greater than 38 wt. % or no greater than 36 wt. % or no greater than 34 wt. % or no greater than 32 wt. % or no greater than 30 wt. % or no greater than 28 wt. % or no greater than 26 wt. % or no greater than 24 wt. % or no greater than 22 wt. % or no greater than 20 wt. % of the total weight of the composition. It will be appreciated that the wt. % of the radiation curable oligomer may be between any of the minimum and maximum values noted above, including for example, but not limited to, at least 1 wt. % and less than 50 wt. % or at least 5% and less than 20%. It will be appreciated that the radiation curable oligomer wt. % may be within a range between any of the minimum and maximum values noted above. It will be further appreciated that the radiation curable oligomer wt. % may be any value between any of the minimum and maximum values noted above.

In an embodiment, the bead polymer of the second component may have a particular composition that may facilitate improved performance and/or manufacturing of the composition. In an embodiment the bead polymer can be an acrylic bead polymer. In an embodiment the bead polymer can include methyl methacrylate, n-butyl methacrylate, or any combination thereof.

In an embodiment, the bead polymer may have a particular $N_A$ MW that may facilitate improved performance and/or manufacturing of the primer composition. In an embodiment, the bead polymer may have an $N_A$ MW of at least 10,000 g/mol or at least 15,000 g/mol or at least 20,000 g/mol or at least 25,000 g/mol or at least 30,000 g/mol or at least 50,000 g/mol or at least 100,000 g/mol or at least 500,000 g/mol. In an embodiment, the bead polymer may have an $N_A$ MW of less than 5,000,000 g/mol or less than 3,000,000 g/mol or less than 1,000,000 g/mol. It will be appreciated that the $N_A$ MW of the bead polymer may be between any of the minimum and maximum values noted above, including for example, but not limited to, at least 20,000 g/mol and not greater than 3,000,000 g/mol or at least 50,000 g/mol and not greater than 1,000,000 g/mol. It will be appreciated that $N_A$ MW of the bead polymer may be within a range between any of the minimum and maximum values noted above. It will be further appreciated that $N_A$ MW of the bead polymer may be any value between any of the minimum and maximum values noted above.

In an embodiment, the bead polymer may include a particular wt. % of the total weight of the composition that may facilitate improved performance and/or manufacturing of the primer composition. In an embodiment the bead polymer can include at least 1 wt. % of the total weight of the composition or at least 2 wt. % or at least 3 wt. % or at least 4 wt. % or at least 5 wt. % of the total weight of the composition. In an embodiment, the bead polymer can include no greater than 50 wt. % of the total weight of the composition or no greater than 48 wt. % or no greater than 46 wt. % or no greater than 44 wt. % or no greater than 42 wt. % or no greater than 40 wt. % or no greater than 38 wt. % or no greater than 36 wt. % or no greater than 34 wt. % or no greater than 32 wt. % or no greater than 30 wt. % or no greater than 28 wt. % or no greater than 26 wt. % or no greater than 24 wt. % or no greater than 22 wt. % or no greater than 20 wt. % of the total weight of the composition. It will be appreciated that the wt. % of the bead polymer may be between any of the minimum and maximum values noted above, including for example, but not limited to, at least 1% and less than 50% or at least 5% and less than 20%. It will be appreciated that wt. % of the bead polymer may be within a range between any of the minimum and maximum values noted above. It will be further appreciated that wt. % of the bead polymer may be any value between any of the minimum and maximum values noted above.

In an embodiment, the second component may include a particular wt. % of the total weight of the composition that may facilitate improved performance and/or manufacturing of the primer composition. In an embodiment the second component can include at least 1 wt. % of the total weight of the composition or at least 2 wt. % or at least 3 wt. % or at least 4 wt. % or at least 5 wt. % of the total weight of the composition. In an embodiment, the second component can include no greater than 50 wt. % of the total weight of the composition or no greater than 48 wt. % or no greater than 46 wt. % or no greater than 44 wt. % or no greater than 42 wt. % or no greater than 40 wt. % or no greater than 38 wt. % or no greater than 36 wt. % or no greater than 34 wt. % or no greater than 32 wt. % or no greater than 30 wt. % or no greater than 28 wt. % or no greater than 26 wt. % or no greater than 24 wt. % or no greater than 22 wt. % or no greater than 20 wt. % of the total weight of the composition. It will be appreciated that the wt. % of the second component may be between any of the minimum and maximum values noted above, including for example, but not limited to, at least 1% and less than 50% or at least 5% and less than 20%. It will be appreciated that the wt. % of the second component may be within a range between any of the minimum and maximum values noted above. It will be further appreciated that the wt. % of the second component may be any value between any of the minimum and maximum values noted above.

In an embodiment, the primer composition can include a photoinitiator. The photoinitiator may have a particular composition that may facilitate improved performance and/or manufacturing of the primer composition. In an embodiment, the photoinitiator may cleave in the presence of the electromagnetic radiation of natural daylight. In an embodiment, the photoinitiator may cleave in the presence of electromagnetic radiation having a wavelength of at least 315 nm and not greater than 400 nm. In an embodiment, the photoinitiator can be a phosphine oxide. In an embodiment, the photoinitiator can include a benzoyl group. In an embodiment, the photo initiator can include an aryl alkyl group. In an embodiment, the photoinitiator can be a Norrish Type 1 initiator.

In an embodiment, the photoinitiator may include Phenyl bis (2,4,6-trimethyl benzoyl)-phosphine oxide; 2-Benzyl-2-dimethylamino-4-morpholinobutyrophenone; 2-benzyl-2-dimethylamino-1-(4-morpholinophenyl)-butanone-1; 1-hydroxycyclohexyl phenyl ketone; 2,4,6 trimethylbenzoyldiphenylphosphine oxide; 2-hydroxy-2-methyl-1-phenylproanone; ethyl (2,4,6-trimethylbenzoyl) phenyl phosphinate; or any combination thereof.

In an embodiment, the photoinitiator may include Phenyl bis (2,4,6-trimethyl benzoyl)-phosphine oxide; 2-Benzyl-2-dimethylamino-4-morpholinobutyrophenone; 2-benzyl-2-dimethylamino-1-(4-morpholinophenyl)-butanone-1; 2,4,6-trimethylbenzoyldiphenylphosphine oxide; ethyl (2,4,6-trimethylbenzoyl)phenyl phosphinate; or any combination thereof.

In an embodiment, the photoinitiator may include Phenyl bis (2,4,6-trimethyl benzoyl)-phosphine oxide; 2-benzyl-2-dimethylamino-1-(4-morpholinophenyl)-butanone-1; 2,4,6-trimethylbenzoyldiphenylphosphine oxide; or any combination thereof.

In an embodiment, the photoinitiator may include Phenyl bis(2,4,6-trimethyl benzoyl)-phosphine oxide; 2,4,6-trimethylbenzoyldiphenylphosphine oxide; or any combination thereof.

In an embodiment, the photoinitiator may include Phenyl bis (2,4,6-trimethyl benzoyl)-phosphine oxide. In an embodiment, the photoinitiator may consist essentially of Phenyl bis (2,4,6-trimethyl benzoyl)-phosphine oxide.

In an embodiment, the primer composition may have a particular photoinitiator content that may facilitate improved performance and/or manufacturing of the primer composition. In an embodiment, the photoinitiator can be at least 0.1 wt. % of the total weight of the composition or at least 0.2 wt. % or at least 0.3 wt. % or at least 0.4 wt. % or at least 0.5 wt. % or at least 1 wt. % or at least 1.5 wt. % or at least 2.0 wt. % or at least 2.5 wt. % or at least 3.0 wt. %. In an embodiment, the photoinitiator can be no greater than 10 wt. % of the total weight of the composition or no greater than 9 wt. % or no greater than 8 wt. % or no greater than 7 wt. % or no greater than 6 wt. % or no greater than 5 wt. %. It will be appreciated that the photoinitiator content may be between any of the minimum or maximum values noted above, including for example at least 1 wt. % and less than 8 wt. % or at least 2 wt. % and less than 5 wt. %. It will be appreciated that photoinitiator content may be within a range between any of the minimum and maximum values noted above. It will be further appreciated that photoinitiator content may be any value between any of the minimum and maximum values noted above.

In an embodiment, the primer composition can also include a wax. The primer composition may include a particular wax that may facilitate improved performance and/or manufacturing of the primer composition. In an embodiment the wax can be a paraffin wax, polyethylene wax, microcrystalline wax, natural wax, or any combination thereof. In an embodiment, the wax can be a paraffin wax.

In an embodiment, the wax may have a particular melting temperature that may facilitate improved performance and/or manufacturing of the primer composition. In an embodiment, the wax melting temperature can be at least 35° C. or at least 36° C. or at least 37° C. or at least 38° C. or at least 39° C. or at least 40° C. or at least 41° C. or at least 42° C. or at least 43° C. or at least 44° C. or at least 45° C. In an embodiment, the wax melting temperature can be less than 75° C. or less than 74° C. or less than 73° C. or less than 72° C. or less than 71° C. or less than 70° C. or less than 69° C. or less than 68° C. or less than 67° C. or less than 66° C. or less than 65° C. It will be appreciated that the wax melting temperature can be between any of the minimum or maximum values noted above, including for example at least 35° C. and less than 75° C. or at least 41° C. and less than 66° C. It will be appreciated that wax melting temperature may be within a range between any of the minimum and maximum values noted above. It will be further appreciated that wax melting temperature may be any value between any of the minimum and maximum values noted above.

In an embodiment, the primer composition may have a particular wax content that may facilitate improved performance and/or manufacturing of the primer composition. In an embodiment, the wax can be at least 0.05 wt. % of the total weight of the composition or at least 0.1 wt. % or at least 0.2 wt. %. In an embodiment, the wax can be no greater than 2.5 wt. % of the total weight of the composition or no greater than 2.0 wt. % or no greater than 1.5 wt. % It will be appreciated that the wax content may be between any of the minimum or maximum values noted above, including for example at least 0.05 wt. % and less than 2.5 wt. % or at least 0.2 wt. % and less than 1.5 wt. %. It will be appreciated that wax content may be within a range between any of the minimum and maximum values noted above. It will be further appreciated that wax content may be any value between any of the minimum and maximum values noted above.

In an embodiment the primer can include the following composition:

5-40 wt. % urethane methacrylate polymer;
60-95 wt. % methacrylate monomer;
0.5-5 wt. % photoinitiator; and
0.2-1.5 wt. % wax.

In an embodiment the primer can include the following composition:

2-20 wt. % urethane methacrylate polymer;
80-90 wt. % methacrylate monomer;
0.5-5 wt. % photoinitiator; and
0.2-1.5 wt. % wax.

In an embodiment the primer composition may include additives that may facilitate improved performance and/or manufacturing of the composition. In an embodiment, the additives can include a dye, a pigment (e.g., titanium dioxide, iron oxides, phthalocyanines), a rheology-modifying agent (e.g., fumed silica, colloidal silica, a copolymer such as poly(ethylene oxide-co-propylene oxide), a filler, an indicator, an anti-oxidant, a fire retardant, a biocide, a UV absorber, a stabilizer, a reaction inhibitor, an abrasion resistance-enhancing additive (e.g., calcium carbonate, barium sulfate, wollastonite), or any combination thereof.

In an embodiment, the primer composition can include an adhesion promoter such as a silane.

In an embodiment, the primer composition can include a particular volatile organic compound (VOC) content that may facilitate improved performance and/or manufacturing of the composition. In an embodiment, the VOC content may be less than 100 g/liter or less than 90 g/liter or less than 80 g/liter or less than 70 g/liter or less than 60 g/liter or less than 50 g/liter or less than 40 g/liter or less than 30 g/liter or less than 20 g/liter or less than 10 g/liter. In an embodiment, the VOC content may be at least 0.001% or at least 0.01%. It will be appreciated that the VOC content may be between any of the minimum and maximum values noted above. VOC content can be measured according to ASTM D5403. VOC content expressed as a wt. % may be converted into g/liter using the density of the composition. It will be appreciated that VOC content may be within a range between any of the minimum and maximum values noted above. It will be further appreciated that VOC content may be any value between any of the minimum and maximum values noted above.

In an embodiment, the primer composition can have a particular flash point that may facilitate improved manufacturing and/or performance of the composition. In an embodiment, the flash point can be at least 75° C. or at least 80° C. or at least 85° C. or at least 90° C. or at least 95° C. or at least 100° C. In an embodiment, the flash point can be less than 200° C. Flash point can be measured according to ASTM D93. It will be appreciated that flash point may be within a range between any of the minimum and maximum values noted above. It will be further appreciated that flash point may be any value between any of the minimum and maximum values noted above.

In an embodiment, the composition may be stored in a container impenetrable by electromagnetic radiation having a wavelength of at least 315 nm and not greater than 400 nm.

In an embodiment, the composition may be applied to a substrate and then cured in the presence of natural daylight. In an embodiment, the substrate may be concrete, metal, plastic, or wood. In a particular embodiment, the substrate may be concrete.

In an embodiment, the primer overlying the substrate may have a particular coat weight that may facilitate improved performance of the composition. In an embodiment, the primer composition may have a coat weight of at least 150 gsm or at least 155 gsm or at least 160 gsm or at least 165 gsm or at least 170 gsm or at least 175 gsm or at least 180 gsm or at least 185 gsm or at least 190 gsm or at least 195 gsm or at least 200 gsm or at least 205 gsm or at least 210 gsm or at least 215 gsm or at least 220 gsm or at least 225 gsm or at least 230 gsm or at least 235 gsm or at least 240 gsm or at least 245 gsm or at least 250 gsm. In an embodiment, the primer composition may have a coat weight of no greater than 2000 gsm or no greater 1800 gsm or no greater than 1600 gsm or no greater than 1400 gsm or no greater than 1200 gsm or no greater than 1000 gsm. It will be appreciated that coat weight may be within a range between any of the minimum and maximum values noted above. It will be further appreciated that coat weight may be any value between any of the minimum and maximum values noted above.

In an embodiment, the substrate may have a particular temperature that may facilitate improved performance of the composition. In an embodiment, the substrate may have a temperature of at least 0° C. or at least 1° C. or at least 2° C. or at least 3° C. or at least 4° C. or at least 5° C. or at least 6° C. or at least 7° C. or at least 8° C. or at least 9° C. or at least 10° C. or at least 11° C. or at least 12° C. or at least 13° C. or at least 14° C. or at least 15° C. In an embodiment, the substrate may have a temperature of less than 80° C. or less than 75° C. or less than 70° C. or less than 65° C. or less than 60° C. It will be appreciated that the substrate temperature may be between any of the minimum and maximum values noted above, including for example, but not limited to, at least 5° C. and less than 80° C. or at least 15° C. and less than 60° C. When the temperature is above 15° C., the composition may have a photoinitiator concentration of at least 0.1 wt. % and less than 3 wt. %. When the temperature is below 15° C., the composition may have a photoinitiator content of at least 1 wt. % and less than 5 wt. %. It will be appreciated that the substrate temperature may be within a range between any of the minimum and maximum values noted above. It will be further appreciated that the substrate temperature may be any value between any of the minimum and maximum values noted above.

In an embodiment, the composition may cure without an artificial light source. In an embodiment, the composition may cure in at least 1 minute and less than 60 minutes at temperatures below 15° C. or less than 55 minutes or less than 50 minutes or less than 45 minutes or less than 40 minutes or less than 35 minutes or less than 30 minutes. In an embodiment, the composition may cure in at least 1 minute and less than 45 minutes at temperatures above 15° C. or less than 40 minutes or less than 35 minutes or less than 30 minutes or less than 25 minutes or less than 20 minutes or less than 15 minutes. It an embodiment, the composition may cure on exposure to electromagnetic radiation having a wavelength of at least 315 nm and not greater than 400 nm. In an embodiment, the composition may be cured in natural daylight with an irradiance of at least 1 watts/$m^2$ or at least 2 watts/$m^2$ or at least 3 watts/$m^2$ or at least 4 watts/$m^2$ or at least 5 watts/$m^2$ or at least 6 watts/$m^2$ or at least 7 watts/$m^2$ or at least 8 watts/$m^2$ or at least 9 watts/$m^2$ or at least 10 watts/$m^2$ or at least 15 watts/$m^2$.

In an embodiment, the cured composition may be adhered to the concrete with a particular strength according to BS EN ISO 4624. In an embodiment, the adhesion strength may be at least 0.5 MPa according to BS EN ISO 4624 or at least 1.0 MPa or at least 1.5 MPa or at least 2.0 MPa or at least 2.5 MPa or at least 3.0 MPa.

EMBODIMENTS

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A primer composition comprising:

a first component comprising a first monomer;

a second component;

a photoinitiator;

wherein the second component comprises a radiation curable oligomer or a bead polymer wherein the composition is configured to cure in the presence of natural daylight.

Embodiment 2. The primer composition of embodiment 1, wherein the second component comprises a radiation curable oligomer.

Embodiment 3. The primer composition of embodiment 1, wherein the second component comprises a bead polymer.

Embodiment 4. The primer composition of embodiment 2, wherein the primer composition further comprises a third component comprising a bead polymer.

Embodiment 5. The primer composition of embodiment 1, embodiment 2, or embodiment 4, wherein the radiation curable oligomer comprises an acrylate, a methacrylate, a urethane (meth)acrylate, an epoxy (meth)acrylate, a polyester (meth)acrylate, an acrylic, a hydrocarbon (meth)acrylate, or any combination thereof.

Embodiment 6. The primer composition of embodiment 1, embodiment 2, or embodiment 4, wherein the radiation curable oligomer comprises a urethane methacrylate.

Embodiment 7. The primer composition of embodiment 1, embodiment 2, or embodiment 4, wherein the radiation curable oligomer comprises a di-functional methacrylate.

Embodiment 8. The concrete primer of embodiment 1, embodiment 2, or embodiment 4, wherein the radiation curable oligomer has the structure, $(H_2C{=}C(R^1)COOR^2)_2{-}R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof.

Embodiment 9. The primer composition of embodiment 1, embodiment 2, or embodiment 4, wherein the radiation curable oligomer comprises an $N_A$ MW of at least 200 g/mol or at least 500 g/mol or at least 1000 g/mol or at least 2000 g/mol or at least 3000 g/mol or at least 4000 g/mol or at least 5000 g/mol or at least 6000 g/mol or at least 7000 g/mol or at least 8000 g/mol or at least 9000 g/mol or at least 10,000 g/mol.

Embodiment 10. The primer composition of embodiment 1, embodiment 2, or embodiment 4, wherein the radiation curable oligomer comprises an $N_A$MW of less than 20,000 g/mol or less than 19,000 g/mol or less than 18,000 g/mol or less than 17,000 g/mol or less than 16,000 g/mol or less than 15,000 g/mol or less than 14,000 g/mol or less than 13,000 g/mol or less than 12,000 g/mol.

Embodiment 11. The primer composition of embodiment 1, embodiment 2, or embodiment 4, wherein the radiation curable oligomer comprises at least 1 wt. % of the total weight of the composition or at least 2 wt. % or at least 3 wt. % or at least 4 wt. % or at least 5 wt. % of the total weight of the composition.

Embodiment 12. The primer composition of embodiment 1, embodiment 2, or embodiment 4, wherein the radiation curable oligomer comprises no greater than 50 wt. % of the total weight of the composition or no greater than 48 wt. % or no greater than 46 wt. % or no greater than 44 wt. % or no greater than 42 wt. % or no greater than 40 wt. % or no greater than 38 wt. % or no greater than 36 wt. % or no greater than 34 wt. % or no greater than 32 wt. % or no greater than 30 wt. % or no greater than 28 wt. % or no greater than 26 wt. % or no greater than 24 wt. % or no greater than 22 wt. % or no greater than 20 wt. % of the total weight of the composition.

Embodiment 13. The primer composition of embodiment 1, embodiment 3, or embodiment 4, wherein the bead polymer comprises an acrylic bead polymer.

Embodiment 14. The primer composition of embodiment 1, embodiment 3, or embodiment 4, wherein the bead polymer comprises methyl methacrylate, n-butyl methacrylate, or any combination thereof.

Embodiment 15. The primer composition of embodiment 1, embodiment 3, or embodiment 4, wherein the bead polymer comprises a $N_A$ MW of at least 10,000 g/mol or at least 15,000 g/mol or at least 20,000 g/mol or at least 25,000 g/mol or at least 30,000 g/mol or at least 50,000 g/mol or at least 100,000 g/mol or at least 500,000 g/mol.

Embodiment 16. The primer composition of embodiment 1, embodiment 3, or embodiment 4, wherein the bead polymer comprises a $N_A$ MW of less than 5,000,000 g/mol or less than 3,000,000 g/mol or less than 1,000,000 g/mol.

Embodiment 17. The primer composition of any one of embodiments 1-4, wherein the bead polymer comprises at least 1 wt. % of the total weight of the composition or at least 2 wt. % or at least 3 wt. % or at least 4 wt. % or at least 5 wt. % of the total weight of the composition.

Embodiment 18. The primer composition of any one of embodiments 1-4, wherein the bead polymer comprises no greater than 50 wt. % of the total weight of the composition or no greater than 48 wt. % or no greater than 46 wt. % or no greater than 44 wt. % or no greater than 42 wt. % or no greater than 40 wt. % or no greater than 38 wt. % or no greater than 36 wt. % or no greater than 34 wt. % or no greater than 32 wt. % or no greater than 30 wt. % or no greater than 28 wt. % or no greater than 26 wt. % or no greater than 24 wt. % or no greater than 20 wt. % or no greater than wt. % or no greater than 20 wt. % of the total weight of the composition.

Embodiment 19. The primer composition of any one of embodiments 1-4, wherein the second component comprises at least 1 wt. % of the total weight of the composition or at least 2 wt. % or at least 3 wt. % or at least 4 wt. % or at least 5 wt. % of the total weight of the composition.

Embodiment 20. The primer composition of any one of embodiments 1-4, wherein the second component comprises no greater than 50 wt. % of the total weight of the composition or no greater than 48 wt. % or no greater than 46 wt. % or no greater than 44 wt. % or no greater than 42 wt. % or no greater than 40 wt. % or no greater than 38 wt. % or no greater than 36 wt. % or no greater than 34 wt. % or no greater than 32 wt. % or no greater than 30 wt. % or no greater than 28 wt. % or no greater than 26 wt. % or no greater than 24 wt. % or no greater than 20 wt. % or no greater than wt. % or no greater than 20 wt. % of the total weight of the composition.

Embodiment 21. The primer composition of any one of embodiments 1-4, wherein the first component can be polymerized in the presence of free radicals.

Embodiment 22. The primer composition of any one of embodiments 1-4, wherein the first monomer comprises a methacrylate monomer.

Embodiment 23. The primer composition of embodiment 22, wherein the methacrylate monomer comprises at least one hydroxyl group.

Embodiment 24. The primer composition of embodiment 22, wherein the methacrylate monomer comprises Methyl methacrylate (MMA), Hydroxypropyl methacrylate (HPMA), Hydroxyethyl methacrylate (HEMA), or any combination thereof.

Embodiment 25. The primer composition of any one of embodiments 1-4, wherein the first monomer has the structure, $H_2C{=}C(R^1)COOR^2$, wherein $R^1$ represents hydrogen atom or methyl group; $R^2$ represents linear or branched alkyl, hydroxyalkyl, aryl, acyclic, polycyclic, heterocyclic, or heteroaromatic group from $C_2$ to $C_{18}$.

Embodiment 26. The primer composition of embodiment 25, wherein $R^1$ represents a methyl group.

Embodiment 27. The primer composition of embodiment 25, wherein $R^2$ represents a hydroxyalkyl group.

Embodiment 28. The primer composition of embodiment 25, wherein $R^2$ represents a hydroxypropyl group.

Embodiment 29. The primer composition of any one of embodiments 1-4, wherein the first monomer comprises a flash point of at least 50° C. or at least 51° C. or at least 52° C. or at least 53° C. or at least 54° C. or at least 55° C. or at least 56° C. or at least 57° C. or at least 58° C. or at least 59° C. or at least 60° C.

Embodiment 30. The primer composition of any one of embodiments 1-4, wherein the first monomer comprises at least 60 wt. % of the total weight of the composition or at least 62 wt. % or at least 64 wt. % or at least 66 wt. % or at least 68 wt. % or at least 70 wt. % or at least 72 wt. % or at least 74 wt. % or at least 76 wt. % or at least 78 wt. % or at least 80 wt. %.

Embodiment 31. The primer composition of any one of embodiments 1-4, wherein the first monomer comprises no greater than 99 wt. % of the total weight of the composition or no greater than 98 wt. % or no greater than 97 wt. % or no greater than 96 wt. % or no greater than 95 wt. % or no greater than 94 wt. % or no greater than 93 wt. % or no greater than 92 wt. % or no greater than 91 wt. % or no greater than 90 wt. %.

Embodiment 32. The primer composition of any one of embodiments 1-4, wherein the photoinitiator cleaves in the presence of electromagnetic radiation having a wavelength of at least 315 nm and not greater than 400 nm.

Embodiment 33. The primer composition of any one of embodiments 1-4, wherein the photoinitiator is a phosphine oxide.

Embodiment 34. The primer composition of any one of embodiments 1-4, wherein the photoinitiator comprises a benzoyl group.

Embodiment 35. The primer composition of any one of embodiments 1-4, wherein the photoinitiator comprises an aryl alkyl group.

Embodiment 36. The primer composition of any one of embodiments 1-4, wherein the photoinitiator is a Norrish Type 1 initiator.

Embodiment 37. The primer composition of any one of embodiments 1-4, wherein the photoinitiator comprises Phenyl bis (2,4,6-trimethyl benzoyl)-phosphine oxide; 2-Benzyl-2-dimethylamino-4-morpholinobutyrophenone; 2-benzyl-2-dimethylamino-1-(4-morpholinophenyl)-butanone-1; 1-hydroxycyclohexyl phenyl ketone; 2,4,6-trimethylbenzoyldiphenylphosphine oxide; 2-hydroxy-2-methyl-1-phenyl-proanone; ethyl (2,4,6-trimethylbenzoyl)phenyl phosphinate; or any combination thereof.

Embodiment 38. The primer composition of any one of embodiments 1-4, wherein the photoinitiator comprises Phenyl bis (2,4,6-trimethyl benzoyl)-phosphine oxide; 2-Benzyl-2-dimethylamino-4-morpholinobutyrophenone; 2-benzyl-2-dimethylamino-1-(4-morpholinophenyl)-butanone-1; 2,4,6-trimethylbenzoyldiphenylphosphine oxide; ethyl (2,4,6-trimethylbenzoyl)phenyl phosphinate; or any combination thereof.

Embodiment 39. The primer composition of any one of embodiments 1-4, wherein the photoinitiator comprises Phenyl bis (2,4,6-trimethyl benzoyl)-phosphine oxide; 2-benzyl-2-dimethylamino-1-(4-morpholinophenyl)-butanone-1; 2,4,6-trimethylbenzoyldiphenylphosphine oxide; or any combination thereof.

Embodiment 40. The primer composition of any one of embodiments 1-4, wherein the photoinitiator comprises Phenyl bis (2,4,6-trimethyl benzoyl)-phosphine oxide; 2,4,6-trimethylbenzoyldiphenylphosphine oxide; or any combination thereof.

Embodiment 41. The primer composition of any one of embodiments 1-4, wherein the photoinitiator comprises Phenyl bis (2,4,6-trimethyl benzoyl)-phosphine oxide.

Embodiment 42. The primer composition of any one of embodiments 1-4, wherein the photoinitiator consists essentially of Phenyl bis (2,4,6-trimethyl benzoyl)-phosphine oxide.

Embodiment 43. The primer composition of any one of embodiments 1-4, wherein the photoinitiator comprises at least 0.1 wt. % of the total weight of the composition or at least 0.2 wt. % or at least 0.3 wt. % or at least 0.4 wt. % or at least 0.5 wt. % or at least 1 wt. % or at least 1.5 wt. % or at least 2.0 wt. % or at least 2.5 wt. % or at least 3.0 wt. %.

Embodiment 44. The primer composition of any one of embodiments 1-4, wherein the photoinitiator comprises no greater than 10 wt. % of the total weight of the composition or no greater than 9 wt. % or no greater than 8 wt. % or no greater than 7 wt. % or no greater than 6 wt. % or no greater than 5 wt. %.

Embodiment 45. The primer composition of any one of embodiments 1-4, further comprising a wax.

Embodiment 46. The primer composition of embodiment 45, wherein the wax is a paraffin wax, polyethylene wax, microcrystalline wax, natural wax, or any combination thereof.

Embodiment 47. The primer composition of embodiment 45, wherein the wax is a paraffin wax.

Embodiment 48. The primer composition of embodiment 45, wherein the wax has a melting temperature of at least 35° C. or at least 36° C. or at least 37° C. or at least 38° C. or at least 39° C. or at least 40° C. or at least 41° C. or at least 42° C. or at least 43° C. or at least 44° C. or at least 45° C.

Embodiment 49. The primer composition of embodiment 45, wherein the wax has a melting temperature of less than 75° C. or less than 74° C. or less than 73° C. or less than 72° C. or less than 71° C. or less than 70° C. or less than 69° C. or less than 68° C. or less than 67° C. or less than 66° C. or less than 65° C.

Embodiment 50. The primer composition of embodiment 45, wherein the wax comprises at least 0.05 wt. % of the total weight of the composition or at least 0.1 wt. % or at least 0.2 wt. %.

Embodiment 51. The primer composition of embodiment 45, wherein the wax comprises no greater than 2.5 wt. % of the total weight of the composition or no greater than 2.0 wt. % or no greater than 1.5 wt. %.

Embodiment 52. The primer composition of embodiment 45, wherein the primer comprises:

5-40 wt. % of the urethane methacrylate polymer
60-95 wt. % of the methacrylate monomer.
0.5-5 wt. % of the photoinitiator; and
0.2-1.5 wt. % of the wax.

Embodiment 53. The primer composition of embodiment 45, wherein the primer comprises:

2-20 wt. % of the urethane methacrylate polymer
80-90 wt. % of the methacrylate monomer.
0.5-5 wt. % of the photoinitiator; and
0.2-1.5 wt. % of the wax.

Embodiment 54. The primer composition of any one of embodiments 1-4, further comprising an additive comprising a dye, a pigment (e.g., titanium dioxide, iron oxides, phthalocyanines), a rheology-modifying agent (e.g., fumed silica, colloidal silica, a copolymer such as poly(ethylene oxide-co-propylene oxide), a filler, an indicator, an antioxidant, a fire retardant, a biocide, a UV absorber, a stabilizer, a reaction inhibitor, an abrasion resistance-enhancing additive (e.g., calcium carbonate, barium sulfate, wollastonite), or any combination thereof.

Embodiment 55. The primer composition of any one of embodiments 1-4, further comprising an adhesion promoter.

Embodiment 56. The primer composition of embodiment 55, wherein the adhesion promoter comprises a silane.

Embodiment 57. The primer composition of any one of embodiments 1-4, further comprising a VOC content of less than 100 g/liter or less than 90 g/liter or less than 80 g/liter or less than 70 g/liter or less than 60 g/liter or less than 50 g/liter or less than 40 g/liter or less than 30 g/liter or less than 20 g/liter or less than 10 g/liter.

Embodiment 58. The primer composition of any one of embodiments 1-4, further comprising a VOC content of at least 0.001% or at least 0.01%.

Embodiment 59. The primer composition of any one of embodiments 1-4, further comprising a flash point of at least 75° C. or at least 80° C. or at least 85° C. or at least 90° C. or at least 95° C. or at least 100° C.

Embodiment 60. The primer composition of any one of embodiments 1-4, further comprising a flash point of less than 200° C.

Embodiment 61. The primer composition of any one of embodiments 1-4, wherein the composition cures without an artificial light source.

Embodiment 62. The primer composition of any one of embodiments 1-4, wherein the composition cures in at least 1 minute and less than 60 minutes at temperatures below 15° C. or less than 55 minutes or less than 50 minutes or less than 45 minutes or less than 40 minutes or less than 35 minutes or less than 30 minutes.

Embodiment 63. The primer composition of any one of embodiments 1-4, wherein the composition cures in at least 1 minute and less than 45 minutes at temperatures above 15° C. or less than 40 minutes or less than 35 minutes or less than 30 minutes or less than 25 minutes or less than 20 minutes or less than 15 minutes.

Embodiment 64. The primer composition of any one of embodiments 1-4, wherein the composition cures on exposure to electromagnetic radiation having a wavelength of at least 315 nm and not greater than 400 nm.

Embodiment 65. The primer composition of any one of embodiments 1-4, wherein the primer is overlying concrete, metal, plastic, or wood.

Embodiment 66. The primer composition of embodiment 65, wherein the primer is adhered to the concrete with a strength of at least 0.5 MPa according to BS EN ISO 4624 or at least 1.0 MPa or at least 1.5 MPa or at least 2.0 MPa or at least 2.5 MPa or at least 3.0 MPa.

Embodiment 67. The primer composition of embodiment 65, wherein the primer has a coat weight of at least 150 gsm or at least 155 gsm or at least 160 gsm or at least 165 gsm or at least 170 gsm or at least 175 gsm or at least 180 gsm or at least 185 gsm or at least 190 gsm or at least 195 gsm or at least 200 gsm or at least 205 gsm or at least 210 gsm or at least 215 gsm or at least 220 gsm or at least 225 gsm or at least 230 gsm or at least 235 gsm or at least 240 gsm or at least 245 gsm or at least 250 gsm.

Embodiment 68. The primer composition of embodiment 65, wherein the primer has a weight of no greater than 2000 gsm or no greater 1800 gsm or no greater than 1600 gsm or no greater than 1400 gsm or no greater than 1200 gsm or no greater than 1000 gsm.

Embodiment 69. The primer composition of any one of embodiments 1-4, wherein the primer is within a container impenetrable by electromagnetic radiation having a wavelength of at least 315 nm and not greater than 400 nm.

Embodiment 70. A method of making a concrete primer comprising:

- mixing a first component comprising a first monomer, a second component, and a photoinitiator to form a primer composition; wherein the second component comprises a radiation curable oligomer or a bead polymer;
- wherein the composition is configured to cure in the presence of natural daylight.

Embodiment 71. The method of embodiment 70, wherein the primer composition is the composition of any one of embodiments 1-69.

Embodiment 72. The method of embodiment 70, wherein the mixing step further comprises mixing the first component, second component, and photoinitiator with a wax.

Embodiment 73. The method of embodiment 72, wherein the mixing step further comprises heating the primer composition until the wax melts and the mixture homogenizes.

Embodiment 74. The method of embodiment 70, further comprising applying the primer composition to a substrate.

Embodiment 75. The method of embodiment 70, further comprising curing the composition in the presence of natural daylight.

Embodiment 76. The method of embodiment 70, wherein the composition is mixed in a heated vessel.

Embodiment 77. A method of priming concrete comprising:

- mixing a first component comprising a first monomer, a second component, and, a photoinitiator to form a primer composition; wherein the second component comprises a radiation curable oligomer or a bead polymer;
- applying the primer composition to a substrate; and
- curing the composition in the presence of natural daylight.

Embodiment 78. The method of embodiment 77, wherein the substrate has a temperature of at least 0° C. or at least 1° C. or at least 2° C. or at least 3° C. or at least 4° C. or at least 5° C. or at least 6° C. or at least 7° C. or at least 8° C. or at least 9° C. or at least 10° C. or at least 11° C. or at least 12° C. or at least 13° C. or at least 14° C. or at least 15° C.

Embodiment 79. The method of embodiment 77, wherein the substrate has a temperature of less than 80° C. or less than 75° C. or less than 70° C. or less than 65° C. or less than 60° C.

Embodiment 80. The method of embodiment 77, wherein the substrate has a temperature of at least 15° C. and less than 60° C.

Embodiment 81. The method of embodiment 80, wherein the primer comprises a photoinitiator content of at least 0.1 wt. % and less than 3 wt. %.

Embodiment 82. The method of embodiment 77, wherein the substrate has a temperature of at least 5° C. and less than 15° C.

Embodiment 83. The method of embodiment 77, wherein the primer comprises a photoinitiator content of at least 1 wt. % and less than 5 wt. %.

Embodiment 84. The method of embodiment 77, comprising an additional step of adding additional photoinitiator to the mixture when the temperature of the substrate is below 15° C.

Embodiment 85. The method of embodiment 77, wherein the substrate comprises concrete, wood, metal, plastic, or any combination thereof.

Embodiment 86. The method of embodiment 77, wherein the substrate comprises concrete.

Embodiment 87. The method of embodiment 77, wherein the primer is applied via spray, drip, roller, brush or any combination thereof.

Embodiment 88. The method of embodiment 77, wherein the method does not include an artificial light source.

Embodiment 89. The method of embodiment 77, wherein the composition is cured in natural daylight with an irradiance of at least 1 watts/$m^2$ or at least 2 watts/$m^2$ or at least 3 watts/$m^2$ or at least 4 watts/$m^2$ or at least 5 watts/$m^2$ or at least 6 watts/$m^2$ or at least 7 watts/$m^2$ or at least 8 watts/$m^2$ or at least 9 watts/$m^2$ or at least 10 watts/$m^2$ or at least 15 watts/$m^2$.

Embodiment 90. The method of embodiment 77, wherein the primer composition is the composition of any one of embodiments 1-69.

Embodiment 91. The method of embodiment 77, wherein the mixing step further comprises mixing the first component, second component, and photoinitiator with a wax.

Embodiment 92. The method of embodiment 77, wherein the mixing step further comprises heating the primer composition until the wax melts and the mixture homogenizes.

EXAMPLES

Example 1—Photoinitiator

Sample concrete primer compositions including HPMA, paraffin wax, resin, and a photoinitiator (sometimes herein referred to as a "PI") were prepared according to the process below having the compositions outlined in Table 1. The resin is a urethane methacrylate resin with $T_g$ between −45° C. and −35° C. and $N_A$ MW of 8000-12000. The resin and HPMA were weighed into a 5 L vessel mixer with an automatic stirrer. While stirring, the wax was added. The vessel was then heated to 65° C. and heated until the wax had melted and the mixture was homogenous. The composition was then poured into a 5 L tin and stirred until cool to ensure the wax remained homogenous.

100 g of the mixture was weighed into 500 ml tins and appropriate levels of initiator were added according to Table 1 below.

TABLE 1

| Sample | HPMA Content (wt. %) | Paraffin Wax Content (wt. %) | Resin content (wt. %) | PI content (wt. %) | PI brand name | PI Chemical name |
|---|---|---|---|---|---|---|
| 1a | 85-95% | 0.5-2% | 5-15% | 0.5% | Speedcure | Phenyl bis(2,4,6- |
| 1b | | | | 1% | BPO | trimethylbenzoyl)-phosphine oxide |
| 2a | 85-95% | 0.5-2% | 5-15% | 0.5% | Speedcure | 2,4,6- |
| 2b | | | | 1% | TPO | trimethylbenzoyldiphenylphosphine oxide |
| 3a | 85-95% | 0.5-2% | 5-15% | 0.5% | Speedcure | Unknown blend |
| 3b | | | | 1% | 4265 | |
| 4a | 85-95% | 0.5-2% | 5-15% | 0.5% | Speedcure | 2-Benzyl-2-dimethylamino-4- |
| 4b | | | | 1% | BDMB | morpholinobutyrophenone |
| 5a | 85-95% | 0.5-2% | 5-15% | 0.5% | Igracure | 2-benzyl-2-dimethylamino-1- |
| 5b | | | | 1% | 369 | (4-morpholinophenyl)-butanone-1 |
| 6a | 85-95% | 0.5-2% | 5-15% | 0.5% | Speedcure | Ethyl (2,4,6- |
| 6b | | | | 1% | TPO-L | trimethylbenzoyl) phenyl phosphinate |
| 7a | 85-95% | 0.5-2% | 5-15% | 0.5% | Speedcure | 1-hydroxycyclohexyl phenyl |
| 7b | | | | 1% | 84 | ketone |
| 8a | 85-95% | 0.5-2% | 5-15% | 0.5% | Speedcure | 2-hydroxy-2-methyl-1- |
| 8b | | | | 1% | 73 | phenylpropanone |

Samples were painted onto concrete slabs maintained at 23° C. with coat weight of 250 g/m$^2$. The slabs were wheeled outside to cure. Irradiance, air temperature, and humidity were recorded during curing. Irradiance was recorded using a Digital Solar Power Meter (Brand OKBY SM206 Sun Light Energy Handheld Measuring Sensor Tester).

Curing was done away from direct sunlight. Cure times plotted alongside irradiance, air temperature, and humidity for various samples can be found in Tables 2-4.

TABLE 2

| Temperature (° C.) | Conditions | Irradiance range (W/m$^2$) |
|---|---|---|
| 6.5-10.7 | Full cloud cover | 16-49 |

| Sample | 1a | 2a | 3a | 4a | 5a | 6a | 7a | 8a |
|---|---|---|---|---|---|---|---|---|
| Cure time (min) | 4 | No cure | No cure | 30 | 45 | No cure | No cure | No cure |

TABLE 3

| Temperature (° C.) | Conditions | Irradiance range (W/m$^2$) |
|---|---|---|
| 3.6-5.9 | Slight rain | 5.8-101 |

| Sample | 1b | 2b | 3b | 4b | 5b | 6b | 7b | 8b |
|---|---|---|---|---|---|---|---|---|
| Cure time (min) | 5 | 15 | 15 | 30 | 30 | 30 | No cure | No cure |

TABLE 4

| Temperature (° C.) | Conditions | | | Irradiance range (W/m$^2$) | | | |
|---|---|---|---|---|---|---|---|
| 2.3-12.4 | Slight rain | | | 58-133.5 | | | |
| Sample | 1b | 2b | 3b | 4b | 5b | 6b | 7b | 8b |
| Cure time (min) | 1 | 2 | 2 | 2 | 15 | 15 | No cure | No cure |

Example 2—Wax Loading

Additional samples were prepared having the compositions below in Table 5 according to the process described above.

TABLE 5

| Sample | HPMA Content (wt. %) | Paraffin Wax Content (wt. %) | Resin content (wt. %) | PI content (wt. %) | PI brand name | PI Chemical name |
|---|---|---|---|---|---|---|
| 9a | 85-95% | 0 | 5-15% | 1% | Speedcure BPO | Phenyl bis(2,4,6-trimethylbenzoyl)-phosphine oxide |
| 9b | 85-95% | 0.5 | 5-15% | 1% | Speedcure BPO | Phenyl bis(2,4,6-trimethylbenzoyl)-phosphine oxide |
| 9c | 85-95% | 1% | 5-15% | 1% | Speedcure BPO | Phenyl bis(2,4,6-trimethylbenzoyl)-phosphine oxide |
| 10a | 85-95% | 0 | 5-15% | 0.5% | Speedcure BPO | Phenyl bis(2,4,6-trimethylbenzoyl)-phosphine oxide |
| 10b | 85-95% | 0.5 | 5-15% | 0.5% | Speedcure BPO | Phenyl bis(2,4,6-trimethylbenzoyl)-phosphine oxide |
| 10c | 85-95% | 1% | 5-15% | 0.5% | Speedcure BPO | Phenyl bis(2,4,6-trimethylbenzoyl)-phosphine oxide |

Samples were tested according to the process described above in example 1 with results in Tables 6 and 7.

TABLE 6

| Temperature (° C.) | Conditions | | Irradiance range (W/m$^2$) |
|---|---|---|---|
| 4.9-5.4 | Bright sun; scattered clouds | | 66.8-112.1 |
| Sample | 9a | 9b | 9c |
| Cure time (min) | 10 | 2 | 2 |

TABLE 7

| Temperature (° C.) | Conditions | | Irradiance range (W/m$^2$) |
|---|---|---|---|
| 8.3-10.6 | Cloudy | | 97.3-115.2 |
| Sample | 10a | 10b | 10c |
| Cure time (min) | 20 | 13 | 5 |

Example 3—Photoinitiator Loading

Additional samples were prepared having the compositions below in Table 8 according to the process described above.

TABLE 8

| Sample | HPMA Content (wt. %) | Paraffin Wax Content (wt. %) | Resin content (wt. %) | PI content (wt. %) | PI brand name | PI Chemical name |
|---|---|---|---|---|---|---|
| 11a | 85-95% | 0.5-2% | 5-15% | 0.3% | Speedcure BPO | Phenyl bis(2,4,6-trimethylbenzoyl)-phosphine oxide |
| 11b | 85-95% | 0.5-2% | 5-15% | 0.5% | Speedcure BPO | Phenyl bis(2,4,6-trimethylbenzoyl)-phosphine oxide |
| 11c | 85-95% | 0.5-2% | 5-15% | 0.8% | Speedcure BPO | Phenyl bis(2,4,6-trimethylbenzoyl)-phosphine oxide |

TABLE 8-continued

| Sample | HPMA Content (wt. %) | Paraffin Wax Content (wt. %) | Resin content (wt. %) | PI content (wt. %) | PI brand name | PI Chemical name |
|---|---|---|---|---|---|---|
| 11d | 85-95% | 0.5-2% | 5-15% | 1% | Speedcure BPO | Phenyl bis(2,4,6-trimethylbenzoyl)-phosphine oxide |

Samples were tested according to the process described above in example 1 with results in Table 9.

TABLE 9

| Temperature (° C.) | Conditions | Irradiance range (W/m$^2$) | | |
|---|---|---|---|---|
| 4.7-5.4 | Bright sun; scattered clouds | 66.8-112.1 | | |
| Sample | 11a | 11b | 11c | 11d |
| Cure time (min) | 2 | 5 | 10 | 15 |

Example 4—Coat Weight

Samples prepared according to sample 1b above were applied to concrete slabs maintained at 23° C. with coat weight/thickness of 150 g/m2, 1 mm, 2 mm, and 3 mm, to form samples 12a, 12b, 12c, and 12d respectively.

Samples were tested according to the process described above in example 1 with results in Table 10.

TABLE 10

| Temperature (° C.) | Conditions | Irradiance range (W/m$^2$) | | |
|---|---|---|---|---|
| 9.3-10.6 | Bright sun; scattered clouds | 64.7-153.8 | | |
| Sample | 12a | 12b | 12c | 12d |
| Cure time (min) | 4 | 8 | 9 | 12 |

Example 5—Monomer Selection

Samples were prepared having the compositions below in Table 11 according to the process described above.

TABLE 11

| Sample | Monomer | Monomer Content (wt. %) | Paraffin Wax Content (wt. %) | Resin content (wt. %) | PI content (wt. %) | PI brand name |
|---|---|---|---|---|---|---|
| 13a | HPMA | 85-95% | 0 | 5-15% | 0.5% | Speedcure BPO |
| 13b | MMA | 85-95% | 0 | 5-15% | 0.5% | Speedcure BPO |
| 13c | MMA | 85-95% | 1% | 5-15% | 1% | Speedcure BPO |

Samples were tested according to the process described above in example 1 with results in Table 12.

TABLE 12

| Temperature (° C.) | Conditions | Irradiance range (W/m$^2$) | |
|---|---|---|---|
| 8.3-10.6 | Cloudy | 97.3-125.8 | |
| Sample | 12a | 12b | 12c |
| Cure time (min) | 20 | 25 | 25 |

Example 6—Low Temperature Curing

Samples were prepared having the compositions below in Table 13 according to the process described above.

TABLE 13

| Sample | HPMA Content (wt. %) | Paraffin Wax Content (wt. %) | Resin content (wt. %) | PI content (wt. %) | PI brand name |
|---|---|---|---|---|---|
| 14a | 85-95% | 0.5-2% | 5-15% | 1% | Speedcure BPO |
| 14b | 85-95% | 0.5-2% | 5-15% | 2% | Speedcure BPO |
| 14c | 85-95% | 0.5-2% | 5-15% | 3% | Speedcure BPO |

Samples were tested according to the process described above in example 1 with results in Table 14. Unlike in sample 1, the substrate temperature was not controlled beforehand. Substrate temperature was measured throughout curing and substrate temperature is below in Table 14.

TABLE 14

| Air Temperature (° C.) | Substrate Temperature (° C.) | Conditions | Irradiance range (W/m$^2$) |
|---|---|---|---|
| 7-13.1 | 3.7-7.2 | Cloudy | 97.3-125.8 |
| Sample | 14a | 14b | 14c |
| Cure time (min) | Did not cure | 23 | 18 |

What is claimed is:

1. A primer composition comprising:

a first component comprising a first monomer;

wherein the first monomer comprises a methacrylate monomer;

a second component;

a photoinitiator; and a wax;

wherein the second component comprises a radiation curable oligomer or a bead polymer, wherein the first monomer has the structure, $H_2C{=}C(R^1)COOR^2$, wherein $R^1$ represents hydrogen atom or methyl group; $R^2$ represents linear or branched alkyl, hydroxyalkyl, aryl, acyclic, polycyclic, heterocyclic, or heteroaromatic group from $C_2$ to $C_{18}$; and wherein the primer composition is curable with electromagnetic radiation having wavelengths between 315 and 400 nm.

2. The primer composition of claim 1, wherein the radiation curable oligomer comprises a urethane methacrylate.

3. The primer composition of claim 1, wherein the radiation curable oligomer comprises a di-functional methacrylate.

4. The primer composition of claim 1, wherein the bead polymer comprises methyl methacrylate, n-butyl methacrylate, or any combination thereof.

5. The primer composition of claim 1, wherein the first monomer comprises Methyl methacrylate (MMA), Hydroxypropyl methacrylate (HPMA), Hydroxyethyl methacrylate (HEMA), or any combination thereof.

6. The primer composition of claim 1, wherein the photoinitiator is a phosphine oxide.

7. The primer composition of claim 1, wherein the photoinitiator is a Norrish Type 1 initiator.

8. The primer composition of claim 1, wherein the photoinitiator comprises Phenyl bis (2,4,6-trimethyl benzoyl)-phosphine oxide; 2-Benzyl-2-dimethylamino-4-morpholinobutyrophenone; 2-benzyl-2-dimethylamino-1-(4-morpholinophenyl)-butanone-1; 1-hydroxycyclohexyl phenyl ketone; 2,4,6-trimethylbenzoyldiphenylphosphine oxide; 2-hydroxy-2-methyl-1-phenylproanone; ethyl (2,4,6-trimethylbenzoyl)phenyl phosphinate; or any combination thereof.

9. The primer composition of claim 1, further comprising an additive comprising a dye, a pigment, a rheology-modifying agent, a filler, an indicator, an anti-oxidant, a fire retardant, a biocide, a UV absorber, a stabilizer, a reaction inhibitor, an abrasion resistance-enhancing additive, or any combination thereof.

10. A method of making a concrete primer comprising:

mixing a first component comprising a first monomer, a second component, the wax, and a photoinitiator to form the primer composition of claim 1; wherein the second component comprises a radiation curable oligomer or a bead polymer.

11. A method of priming a substrate comprising:

mixing the first component comprising the first monomer, the second component, the wax, and the photoinitiator to form the primer composition of claim 1; wherein the second component comprises the radiation curable oligomer or the bead polymer;

applying the primer composition to a substrate; and curing the primer composition in the presence of electromagnetic radiation having wavelengths between 315 and 400 nm to form a cured composition, thereby priming the substrate.

12. The method of claim 11, wherein the substrate has a temperature of at least 5° C. and no greater than 80° C.

13. The method of claim 11, wherein the substrate comprises concrete, metal, plastic, or wood.

14. The method of claim 13, wherein the cured composition is adhered to the concrete with an adhesion strength of at least 0.5 MPa according to BS EN ISO 4624.

15. The method of claim 11, wherein the curing step does not include an artificial light source.

16. The method of claim 10, wherein the mixing step further comprises mixing the first component, the second component, and the photoinitiator with a wax to form the primer composition.

17. The method of claim 16, wherein the mixing step further comprises heating the primer composition until the wax melts and the mixture homogenizes.

18. The primer composition of claim 1, wherein the radiation curable oligomer has the structure, $(H_2C{=}C(R^1)COOR^2)_2{-}R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof.

19. The primer composition of claim 1, wherein the wax comprises a paraffin wax, polyethylene wax, microcrystalline wax, natural wax, or any combination thereof.

20. The primer composition of claim 1, wherein the wax exhibits a melting temperature of at least 35° C. and no greater than 75° C.

21. The primer composition of claim 1, wherein the wax content of the primer composition is at least 0.05 wt. % and no greater than 2.5 wt. %.

22. The primer composition of claim 1, where the primer composition comprises a homogenous mixture of the first monomer, the second component, the wax, and the photoinitiator.

23. A primer composition comprising:

a first component comprising a first monomer;

wherein the first monomer comprises a methacrylate monomer;

a second component;

a photoinitiator; and a wax;

wherein the radiation curable oligomer has the structure, $(H_2C{=}C(R^1)COOR^2)_2{-}R^3$, wherein $R^1$ represents hydrogen atom or methyl group; $R^2$ represents $C_1$ to $C_3$ oxyalkylene or polyoxyalkylene; and $R^3$ represents an epoxy, polyacrylate, polyester, polyether, polyolefin, polysiloxane, polyurethane, vinyl polymer, or copolymer thereof and, wherein the primer composition is curable under natural daylight including electromagnetic radiation having wavelengths between 315 and 400 nm.

24. The primer composition of claim 23, wherein the radiation curable oligomer comprises a urethane methacrylate.

25. The primer composition of claim 23, wherein the radiation curable oligomer comprises a di-functional methacrylate.

26. The primer composition of claim 23, wherein the bead polymer comprises methyl methacrylate, n-butyl methacrylate, or any combination thereof.

27. The primer composition of claim 23, wherein the first monomer comprises Methyl methacrylate (MMA), Hydroxypropyl methacrylate (HPMA), Hydroxyethyl methacrylate (HEMA), or any combination thereof.

28. The primer composition of claim 23, wherein the first monomer has the structure, $H_2C{=}C(R^1)COOR^2$, wherein $R^1$ represents hydrogen atom or methyl group; $R^2$ represents linear or branched alkyl, hydroxyalkyl, aryl, acyclic, polycyclic, heterocyclic, or heteroaromatic group from $C_2$ to $C_{18}$.

29. The primer composition of claim 23, wherein the composition is curable in the presence of natural daylight including electromagnetic radiation having wavelengths between 315 and 400 nm.

30. A method of priming a substrate comprising:

mixing the first component comprising the first monomer, the second component, the wax, and the photoinitiator to form the primer composition of claim 23; wherein the second component comprises the radiation curable oligomer or the bead polymer;

applying the primer composition to a substrate; and curing the primer composition in the presence of electromagnetic radiation having wavelengths between 315 and 400 nm, thereby priming the substrate.

31. A primer composition comprising:

a first component comprising a first monomer;

a second component;

a photoinitiator; and a wax;

wherein the second component comprises a radiation curable oligomer or a bead polymer, wherein the first monomer has the structure, $H_2C{=}C(R^1)COOR^2$, wherein $R^1$ represents hydrogen atom or methyl group; $R^2$ represents linear or branched alkyl, hydroxyalkyl, aryl, acyclic, polycyclic, heterocyclic, or heteroaromatic group from $C_2$ to $C_{18}$; and wherein the primer composition is curable with electromagnetic radiation having wavelengths between 315 and 400 nm, wherein the radiation curable oligomer comprises a difunctional methacrylate.

32. The primer composition of claim 31, wherein the first monomer comprises a methacrylate monomer.

33. The primer composition of claim 1, wherein the bead polymer comprises methyl methacrylate, n-butyl methacrylate, or any combination thereof.

* * * * *